United States Patent
Takemori et al.

(10) Patent No.: US 11,364,750 B2
(45) Date of Patent: Jun. 21, 2022

(54) PNEUMATIC TIRE

(71) Applicant: The Yokohama Rubber Co., LTD., Tokyo (JP)

(72) Inventors: Ryohei Takemori, Hiratsuka (JP); Masaaki Nagayasu, Hiratsuka (JP); Yuki Sasaya, Hiratsuka (JP); Atsushi Tanno, Hiratsuka (JP); Hiraku Kouda, Hiratsuka (JP); Jun Matsuda, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 106 days.

(21) Appl. No.: 16/768,629

(22) PCT Filed: Nov. 19, 2018

(86) PCT No.: PCT/JP2018/042670
§ 371 (c)(1),
(2) Date: May 29, 2020

(87) PCT Pub. No.: WO2019/107202
PCT Pub. Date: Jun. 6, 2019

(65) Prior Publication Data
US 2021/0170807 A1 Jun. 10, 2021

(30) Foreign Application Priority Data
Nov. 29, 2017 (JP) .............................. JP2017-229406

(51) Int. Cl.
*B60C 15/04* (2006.01)
*B60C 15/024* (2006.01)
(Continued)

(52) U.S. Cl.
CPC .......... *B60C 15/04* (2013.01); *B60C 15/0036* (2013.01); *B60C 15/024* (2013.01);
(Continued)

(58) Field of Classification Search
CPC ............ B60C 2015/048; B60C 15/024; B60C 17/0009; B60C 17/08; B60C 15/04;
(Continued)

(56) References Cited

U.S. PATENT DOCUMENTS

| 5,511,600 A * | 4/1996 | Glotzbach ............... B60C 15/04 152/540 |
| 5,779,829 A | 7/1998 | Prakash et al. |

(Continued)

FOREIGN PATENT DOCUMENTS

| JP | S59-051602 | 4/1984 |
| JP | 2000-142041 | 5/2000 |

(Continued)

OTHER PUBLICATIONS

Machine Translation: JP-2002301915-A, Tanaka, Masatoshi, (Year: 2021).*

(Continued)

*Primary Examiner* — Kendra Ly
(74) *Attorney, Agent, or Firm* — Thorpe North & Western

(57) ABSTRACT

A pneumatic tire is provided. In a meridian cross-section, an external contour shape of the bead core is a polygon formed by common tangent lines of a plurality of circumferential portions of a bead wire, the external contour shape includes a single vertex located toward the outside in a tire radial direction, an internal angle formed by two sides sandwiching the vertex is an acute angle, a bottom side of the external contour shape is inclined with respect to the tire lateral direction by from 2° to 9°, and the carcass layer is bent and folded back along a circumference of the bead core in a bead portion, a folded back portion of the carcass layer from a position of an outer end of the bead core in the tire radial direction extends toward a sidewall portion in contact with a body portion.

12 Claims, 7 Drawing Sheets

(51) Int. Cl.
  *B60C 17/08* (2006.01)
  *B60C 17/00* (2006.01)
  *B60C 15/00* (2006.01)
  *B60C 15/06* (2006.01)

(52) U.S. Cl.
  CPC .. *B60C 17/0009* (2013.01); *B60C 2015/0245* (2013.01); *B60C 2015/046* (2013.01); *B60C 2015/048* (2013.01); *B60C 2015/0614* (2013.01)

(58) Field of Classification Search
  CPC ........ B60C 2015/042; B60C 2015/044; B60C 2015/046
  See application file for complete search history.

(56) References Cited

U.S. PATENT DOCUMENTS

| | | | |
|---|---|---|---|
| 2003/0019557 A1 | 1/2003 | Prakash et al. | |
| 2016/0243901 A1* | 8/2016 | Tatsumi | B60C 15/02 |

FOREIGN PATENT DOCUMENTS

| | | | | |
|---|---|---|---|---|
| JP | 2000-351306 | 12/2000 | | |
| JP | 2001-206027 | 7/2001 | | |
| JP | 2002-301915 | 10/2002 | | |
| JP | 2002301915 A | * 10/2002 | ............ | D07B 1/062 |
| JP | 2008-149778 | 7/2008 | | |
| JP | 2009126262 A | * 6/2009 | | |
| JP | 2010-012829 | 1/2010 | | |
| JP | 2013-052720 | 3/2013 | | |
| JP | 2015-131523 | 7/2015 | | |
| WO | WO 97/07995 | 3/1997 | | |
| WO | WO 2015/105087 | 7/2015 | | |

OTHER PUBLICATIONS

Machine Translation: JP-2009126262-A, Maehara, Daisuke, (Year: 2021).*

International Search Report for International Application No. PCT/JP2018/042670 dated Feb. 19, 2019, 4 pages, Japan.

* cited by examiner

PNEUMATIC TIRE

TECHNICAL FIELD

The present technology relates to a pneumatic tire including a side reinforcing layer in a sidewall portion and particularly relates to a pneumatic tire with an enhanced bead portion structure and reduced tire weight and providing excellent rim disengagement resistance and low engagement pressure in a well-balanced manner.

BACKGROUND ART

Typically, a bead core and a bead filler are embedded in a bead portion of a pneumatic tire. Also, a pneumatic tire that can safely travel a certain distance with a puncture (i.e., a run-flat tire) typically includes a side reinforcing layer (a layer made of hard rubber with a crescent-shaped cross-sectional shape) disposed in a sidewall portion, the side reinforcing layer bearing the applied load of the vehicle when a tire is punctured. In such a tire, the radially inner end portions of the side reinforcing layer may extend to the bead portion region. This may increase the wall thickness of the bead portion region and increase tire weight. In recent years, there has been a strong demand for reduction in tire weight. As such, weight reduction in run-flat tires has also been looked into. For example, Japan Unexamined Patent Publication No. 2002-301915 describes devising the shape of a bead core to provide a pneumatic tire including a side reinforcing layer with a crescent-shaped cross-sectional shape that includes no bead filler and had reduced tire weight.

However, a side reinforcing layer in a run-flat tire increases the rigidity of the region where the rim flange abuts the tire. Thus, in run-flat running condition, a force is generated that rotates the bead portion in the tire inner direction about a point as a fulcrum where the rim flange abuts the tire. This rotational force may cause the rim to disengage. To increase rim disengagement resistance, engagement pressure is commonly increased. However, this may lead to a decrease in mountability of the tire on a rim. The tire of the cited document 1 described above has a certain degree of rim disengagement resistance. However, rim disengagement caused by the rotational force about the point as a fulcrum where the rim flange abuts the tire has not been considered. Thus, the tire does not have sufficient rim disengagement prevention properties. Also, engagement pressure is not sufficiently decreased. In light of the foregoing, there is a demand for a run-flat tire with reduced tire weight that provides excellent rim disengagement resistance and low engagement pressure in a well-balanced manner.

SUMMARY

The present technology provides a pneumatic tire including a side reinforcing layer in a sidewall portion, the pneumatic tire having an enhanced bead portion structure and reduced tire weight and providing excellent rim disengagement resistance and low engagement pressure in a well-balanced manner.

A pneumatic tire according to an embodiment of the present technology includes a tread portion with an annular shape that extends in a tire circumferential direction, a pair of sidewall portions disposed on either side of the tread portion, a pair of bead portions disposed toward the inside of the sidewall portions in a tire radial direction, a bead core disposed in each one of the pair of bead portions, a carcass layer mounted between the pair of bead portions, and a side reinforcing layer having a crescent-shaped cross-section disposed toward the inside in a tire lateral direction of the carcass layer at each one of the pair of sidewall portions.

The bead core includes at least one bead wire wound in the tire circumferential direction, in a meridian cross-section, a plurality of circumferential portions of the bead wire form at least one row in line in the tire lateral direction and a plurality of layers layered in the tire radial direction. In a meridian cross-section, an external contour shape of the bead core is a polygon formed by common tangent lines of the circumferential portions of the bead wire, the external contour shape includes a single vertex located toward the outside in the tire radial direction, an internal angle formed by two sides sandwiching the vertex is an acute angle, the external contour shape includes a bottom side located toward the inside in the tire radial direction extending at an incline with respect to the tire lateral direction, and the bottom side forms an angle with respect to the tire lateral direction from 2° to 9°. The carcass layer includes a body portion that extends from the tread portion, through a sidewall portion of the pair of sidewall portions, to a bead portion of the pair of bead portions, and a folded back portion that is bent and folded back along a circumference of the bead core in each one of the bead portions and is extending from a position of an outer end of the bead core in the tire radial direction toward one of the pair of sidewall portions in contact with the body portion.

In the present technology, the bead core has the structure described above. Thus, the number of times the bead wire is wound near the vertex of the external contour shape is reduced, and the number of times the bead wire is wound near the bottom side is sufficiently ensured. Accordingly, the performance of the bead core is sufficiently maintained and tire durability is ensured and the amount of bead wire used can be reduced to reduce tire weight. Also, the carcass is folded back bending along the bead core with such a shape. Thus, the closed region surrounded by the body portion and the folded back portion of the carcass layer essentially includes only the bead core. This allows the tire weight to be lower than that of tires with a known bead filler. Also, by not providing bead filler, rigidity can be appropriately reduced and rim disengagement caused by the rotational force about the point as a fulcrum where the rim flange abuts the tire can be prevented. Here, the carcass layer is bent and folded back, giving the bead core a shape with a single vertex as described above. This prevents the carcass layer from being too sharply bent. Furthermore, with the folded back portion of the carcass layer being in contact with the body portion, failures caused by stress concentration at the terminating end of the folded back portion can be prevented. Also, the bottom side of the external contour shape is appropriately inclined. This decreases engagement pressure and improves mountability on a rim.

In an embodiment of the present technology, a rubber layer located further toward the inside in the tire radial direction than a portion of the carcass layer contacting the bottom side of the external contour shape is defined as a core lower material, and a core lower material compression ratio Cm calculated by Formula 1 below using a thickness H of the core lower material measured along a perpendicular line L2 from the vertex of the external contour shape to the bottom side before mounting on a rim and a thickness H' of the core lower material measured along the perpendicular line L2 after mounting on a rim is preferably from 10% to 60%. Setting the core lower material compression ratio Cm within an appropriate range in this manner is advantageous

in that excellent rim disengagement resistance can be obtained and engagement pressure can be reduced.

$$Cm = (H - H')/H \times 100 \qquad (1)$$

In an embodiment of the present technology, a portion located between a bead toe and a bead heel of the bead portion is defined as a bead base portion, and a contour line of the bead base portion in a meridian cross-section preferably bends and has two different taper angles. In this way, the bead base portion that abuts the rim is given a good shape. This is advantageous in that excellent rim disengagement resistance can be obtained and engagement pressure can be reduced.

In an embodiment of the present technology, a relationship $0.3 \leq \alpha/\beta \leq 0.8$ is preferably satisfied, where a is a length in the tire radial direction from an intersection point P2 of a perpendicular line L2 that extends to the bottom side from the vertex of the external contour shape and an outer surface of the carcass layer located toward the inside of the bead core in the tire radial direction to a bend point of a contour line of the bead base portion and β is a length in the tire radial direction from the intersection point P2 to the bead toe. In this way, the elements constituting the bead portion are given a good positional relationship. This is advantageous in that excellent rim disengagement resistance can be obtained and engagement pressure can be reduced.

In an embodiment of the present technology, at least one internal angle of corner portions located on either end of the bottom side of the external contour shape is preferably 90° or greater. In this way, the arrangement of the bead wire can be prevented from being disrupted in vulcanization and the shape of the bead core after vulcanization is improved. This is advantageous in that the tire weight can be reduced and good rigidity can be ensured.

In an embodiment of the present technology, a distance T between intersection points P4 and P5 is preferably from 3.1 mm to 4.0 mm, where, in a meridian cross-section, P4 is an intersection point of a straight line L3 extending in the tire radial direction contacting with an inner side in a tire axial direction of a circumferential portion of the plurality of circumferential portions of the bead wire located innermost in the tire axial direction and an outer surface of the carcass layer 4 and P5 is an intersection point of the straight line L3 and a contour line of a bead base portion. In this way, the elements constituting the bead portion are given a good positional relationship. This is advantageous in that excellent rim disengagement resistance can be obtained and engagement pressure can be reduced.

In an embodiment of the present technology, in a meridian cross-section, a tire cross-sectional width T1 along an auxiliary line A1 and a tire cross-sectional width T2 along an auxiliary line A2 preferably satisfy a relationship $0.7 \leq T1/T2 \leq 1.5$, where the auxiliary line A1 is an auxiliary line running orthogonal to the carcass layer that passes through an intersection point P1 of a straight line L1 extending parallel with the tire width direction separated from a bead toe 20 mm toward the outside in the tire radial direction and a contour line of an outer surface of the sidewall portion and A2 is an auxiliary line that passes through a center of gravity of the bead core and extends in an inclination direction of the bottom side of the external contour shape. In this way, the rigidity of the region where the rim flange abuts the tire can be appropriately reduced and rim disengagement caused by the rotational force about the point as a fulcrum where the rim flange abuts the tire can be suppressed. This is advantageous in increasing rim disengagement resistance.

In an embodiment of the present technology, the carcass layer preferably includes only one layer. This is advantageous in that the amount of carcass layer used can be reduced and tire weight can be reduced.

In the present technology, each dimension is measured with the tire mounted on a regular rim and inflated to the regular internal pressure. "Regular rim" is a rim defined by a standard for each tire according to a system of standards that includes standards on which tires are based, and refers to a "standard rim" in the case of JATMA (Japan Automobile Tyre Manufacturers Association, Inc.), refers to a "design rim" in the case of TRA (The Tire and Rim Association, Inc.), and refers to a "measuring rim" in the case of ETRTO (European Tire and Rim Technical Organization). "Regular internal pressure" is an air pressure defined by standards for each tire according to a system of standards that includes standards on which tires are based, and refers to a "maximum air pressure" in the case of JATMA, refers to the maximum value in the table of "TIRE ROAD LIMITS AT VARIOUS COLD INFLATION PRESSURES" in the case of TRA, and refers to the "INFLATION PRESSURE" in the case of ETRTO. "Regular internal pressure" is 180 kPa for a tire on a passenger vehicle.

DETAILED DESCRIPTION

Configurations of embodiments of the present technology will be described in detail below with reference to the accompanying drawings.

Figure 1:
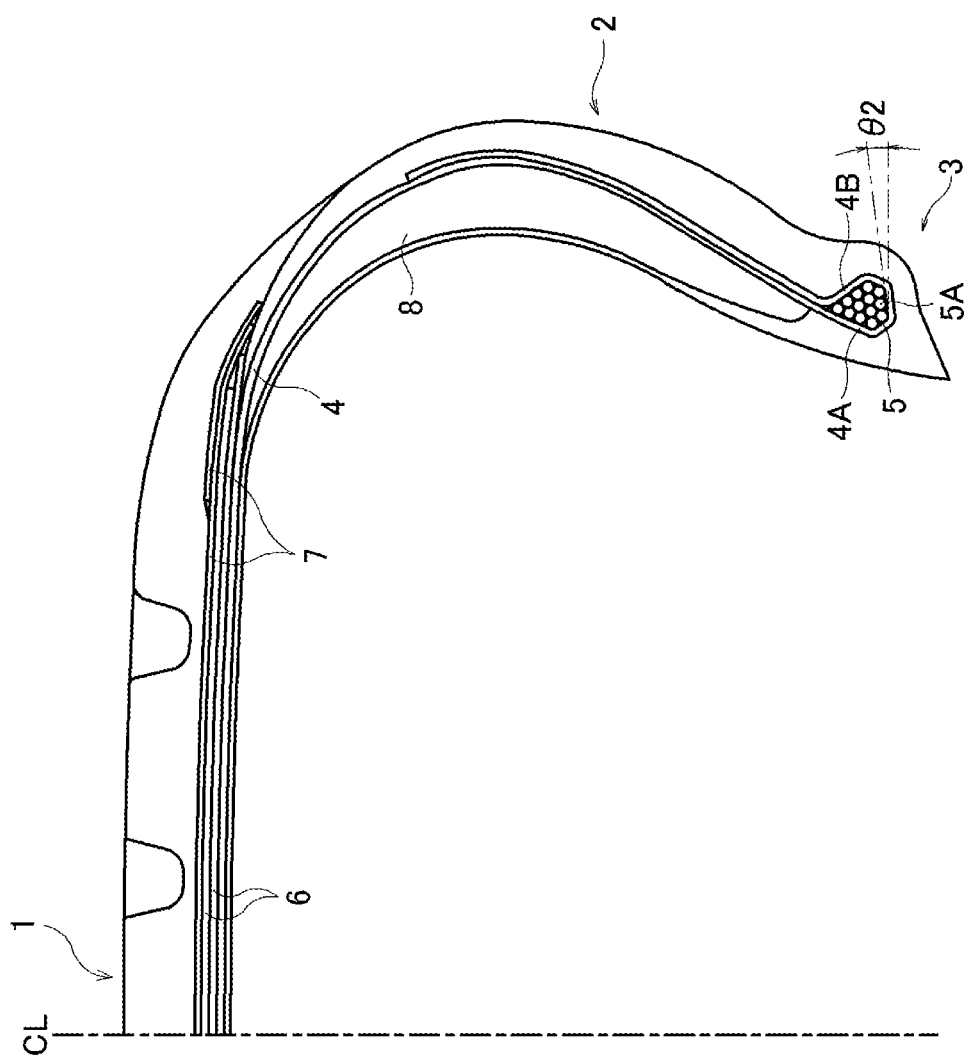
FIG. 1 is a half cross-sectional view taken along a meridian of a pneumatic tire according to an embodiment of the present technology.

As illustrated in FIG. 1, the pneumatic tire of an embodiment of the present technology includes an annular tread portion 1 extending in the tire circumferential direction, a pair of sidewall portions 2 disposed on both sides of the tread portion 1, and a pair of bead portions 3 disposed toward the inside of the sidewall portions 2 in the tire radial direction. Note that "CL" in FIG. 1 denotes the tire equator.

A carcass layer 4 is mounted between the left-right pair of bead portions 3. The carcass layer 4 includes a plurality of reinforcing cords extending in the tire radial direction, and is folded back around a bead core 5 disposed in each of the bead portions 3 from a vehicle inner side to a vehicle outer side. In the following description, a portion from the tread portion 1 passed the sidewall portion 2 to the bead portion 3 is referred to as a body portion 4A, and a portion in the bead portion 3 folded back around the bead core 5 and extends toward the sidewall portion 2 is referred to as folded back portion 4B. Note that in the present technology, the basic performance such as rim disengagement resistance is ensured by the structure of the bead portion 3 described below. This eliminates the need to form the carcass layer 4 from a plurality of layers, allowing the number of layers to be reduced. In particular, the carcass layer 4 preferably includes only one layer as illustrated.

Figure 2:
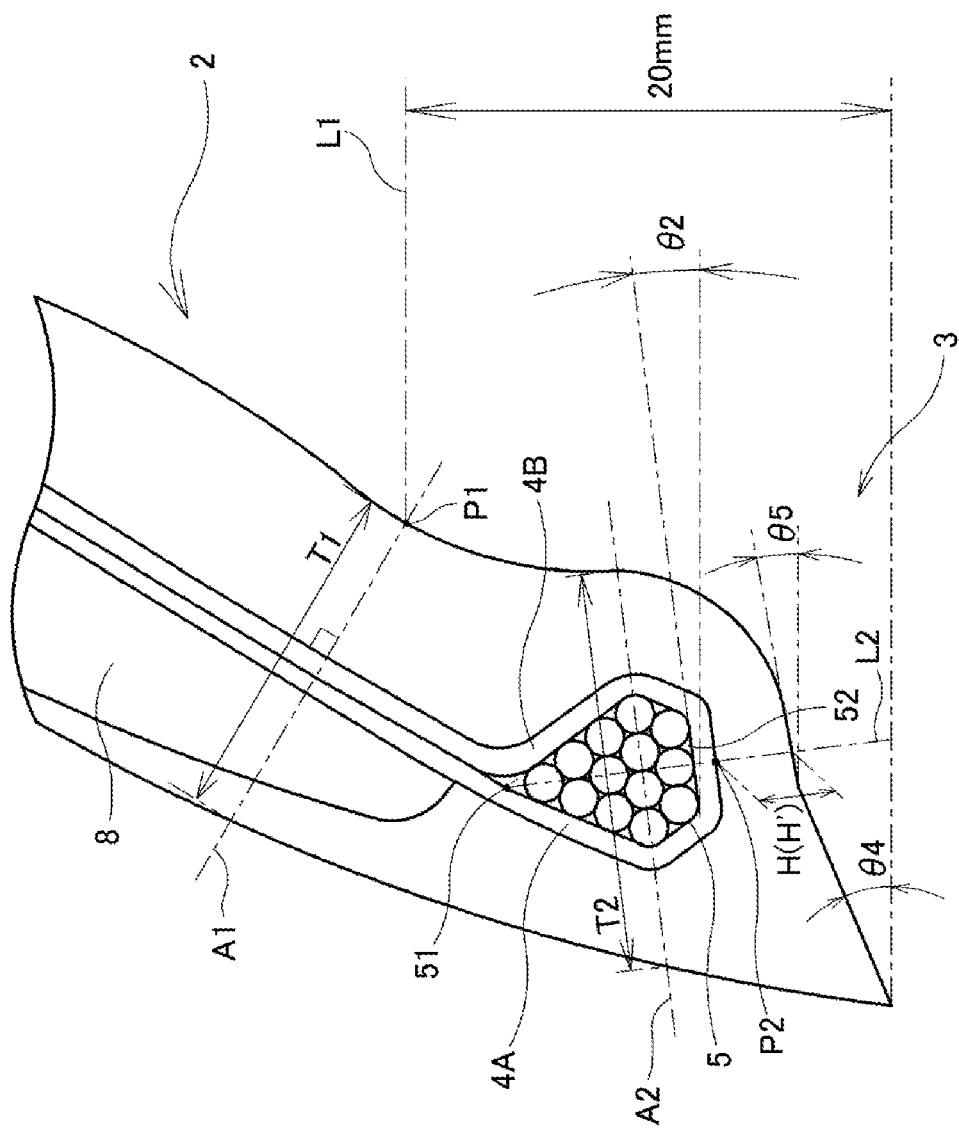
FIG. 2 is an enlarged explanatory diagram illustrating a region including a bead portion of FIG. 1.
Figure 3:
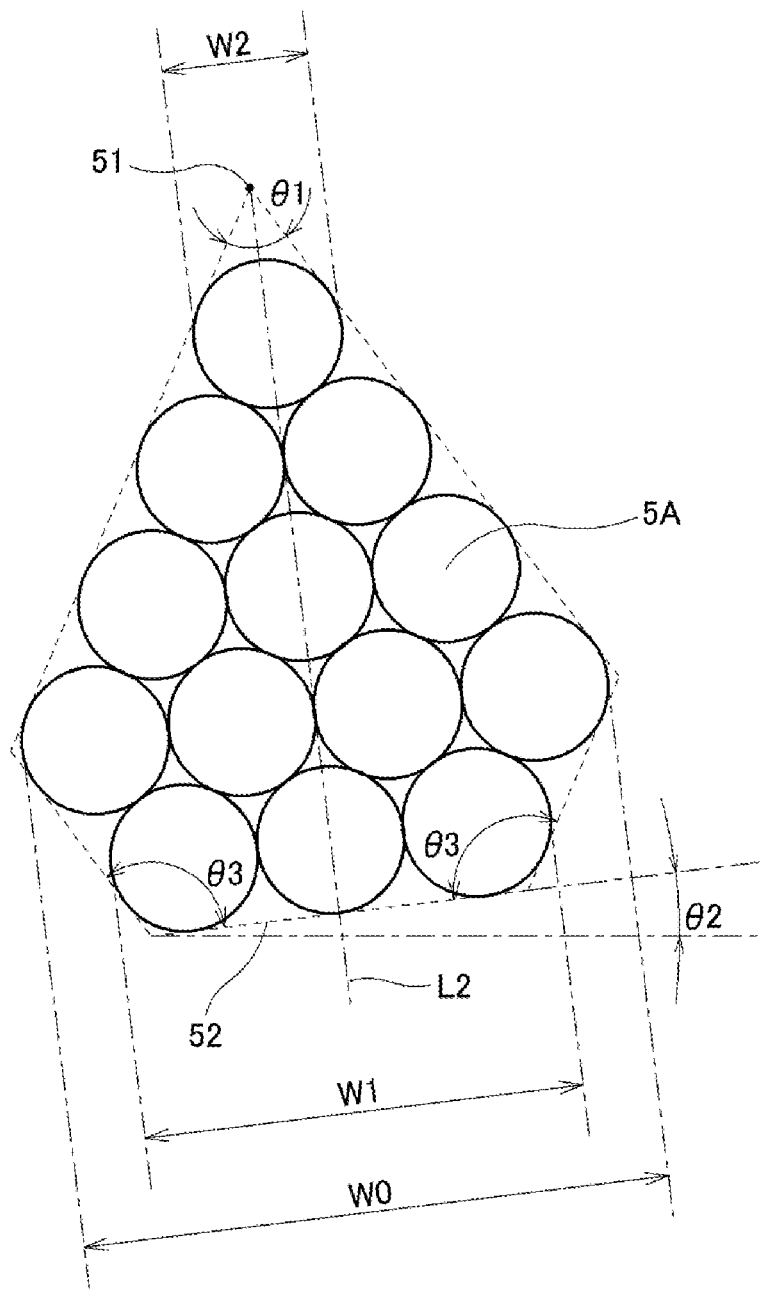
FIG. 3 is an enlarged explanatory diagram illustrating a bead core of FIG. 2.

As illustrated in an enlarged manner in FIGS. 2 and 3, the bead core 5 includes at least one bead wire 5A wound in the tire circumferential direction. The circumferential portions of the bead wire 5A form at least one row in line in the tire lateral direction and a plurality of layers layered in the tire radial direction. In the present technology, with the plurality of circumferential portions of the bead wire 5A being formed from rows and layers as viewed in a meridian cross-section, the structure may be a one-wire structure of a single bead wire 5A wound continuously around or a layered wound structure of a plurality of bead wires 5A bunched together and wound. In the illustrated example, the structure includes a total of five layers. The five layers include, from the inner side in the tire radial direction, a layer including a row of three circumferential portions, a layer including a row of four circumferential portions, a layer including a row of three circumferential portions, a layer including a row of two circumferential portions, and a layer including a row of one circumferential portion. Note that in the following description, this structure is referred to as a "3+4+3+2+1 structure". In the following description, the multilayer structure of the bead wire 5A is expressed in a similar format using "+" between the number of rows included in each of the layers listed in order from the inner side in the tire radial direction. Furthermore, in the bead core 5 of the illustrated example, the bead wires 5A are packed together in layers. Note that "packed" refers to a way of packing in which the centers of three circumferential portions in contact with one another make a substantially regular triangle or a packing method with a high space filling ratio such as the hexagonal filling arrangement.

Here, the bead core 5 has an external contour shape (dashed line in the drawings) of a polygon formed by tangent lines common between the plurality of circumferential portions of the bead wire 5A as viewed in a meridian cross-section. This external contour shape includes a single vertex 51 located toward the outside in the tire radial direction and a bottom side 52 located toward the inside in the tire radial direction opposite the vertex 51. In particular, the bead core 5 of the illustrated example has a pentagonal external contour shape with the 3+4+3+2+1 structure described above. In the present technology, the internal angle θ1 formed by two sides on either side of the vertex 51 is required to be an acute angle, and the bead core 5 has an overall shape that tapers gradually decreasing in width from the widest portion toward the outside in the tire radial direction (this shape is also referred to as a "radially outward wedge shape"). Also, in the present technology, the bottom side 52 extends at an incline with respect to the tire lateral direction, making the bead core 5 overall have an inclined structure. Specifically, the bottom side 52 inclines toward the outside in the tire radial direction with respect to the tire lateral direction as it extends from the inner side to the outer side in the tire lateral direction. Here, an angle θ2 formed by the bottom side 52 and the tire lateral direction is set to from 2° to 9°.

The carcass layer 4 is folded back around the bead core 5 as described above. With the bead core 5 of the present technology having a specialized shape (radially outward wedge shape) as described above, the carcass layer 4 bends around the circumference of the bead core 5. For example, in the illustrated example, the bead core 5 satisfies the details described above, giving it a substantially pentagonal cross-sectional shape. Accordingly, the carcass layer 4 that extends around the circumference of the bead core 5 bends forming a substantially pentagonal shape. Furthermore, the portion of the folded back portion 4B of the carcass layer 4 located further toward the outside in the tire radial direction than a radially outer end of the bead core 5 extends toward the sidewall portion 2 along the body portion 4A of the carcass layer 4 in contact with the body portion 4A of the carcass layer 4. As a result, the body portion 4A and the folded back portion 4B of the carcass layer 4 form a closed region around the bead core 5.

A plurality (in the illustrated example, two layers) of belt layers 6 are embedded on an outer circumferential side of the carcass layer 4 in the tread portion 1. The belt layers 6 each include a plurality of reinforcing cords that are inclined with respect to the tire circumferential direction. The reinforcing cords of the different layers are arranged in a criss-cross manner. In these belt layers 6, the inclination angle of the reinforcing cords with respect to the tire circumferential direction ranges from, for example, 10° to 40°. In addition, a belt reinforcing layer 7 is provided on the outer circumferential side of the belt layers 6. In particular, in the illustrated example, a full cover layer covering the entire width of the belt layers 6 and two edge cover layers covering only the end portions of the belt reinforcing layer 7 on both sides are provided. The belt reinforcing layer 7 includes organic fiber cords oriented in the tire circumferential direction. In the belt reinforcing layer 7, the angle of the organic fiber cords with respect to the tire circumferential direction is set, for example, to from 0° to 5°.

A side reinforcing layer 8 with a crescent-shaped cross-section is disposed on the inner side in the tire lateral direction of the carcass layer 4 in the sidewall portion 2. The side reinforcing layer 8 is made of rubber harder than the rubber of the sidewall portion 2. Specifically, the rubber of the side reinforcing layer 8 has a JIS-A hardness of from 70 to 80, for example, and a modulus at 100% elongation of from 9.0 MPa to 10.0 MPa. The side reinforcing layer 8 with such physical properties has sufficient rigidity to enable run-flat running by bearing the load when the tire has a puncture.

In the present technology, the bead core 5 has a specialized shape (radially outward wedge shape) as described above. Thus, the number of times the bead wire 5A is wound near the vertex 51 of the external contour shape is reduced, and the number of times the bead wire 5A is wound near the bottom side 52 is sufficiently ensured. Accordingly, the performance of the bead core 5 is sufficiently maintained and tire durability is ensured and the amount of bead wire 5A used can be reduced to reduce tire weight. Also, the carcass layer 4 is folded back bending along the bead core 5 with such a shape. Thus, the closed region surrounded by the body portion 4A and the folded back portion 4B of the carcass layer 4 essentially includes only the bead core 5. This allows the tire weight to be lower than that of tires with a known bead filler. Also, by bead filler not being providing, rigidity can be appropriately reduced and rim disengagement caused by the rotational force about the point as a fulcrum where the rim flange abuts the tire can be prevented. Here, the carcass layer 4 is bent and folded back, giving the bead core 5 a shape with a single vertex 51 as described above. This prevents the carcass layer 4 from being too sharply bent. Furthermore, by the folded back portion 4B of the carcass layer 4 being in contact with the body portion 4A, failures caused by stress concentration at the terminating end of the folded back portion 4B can be prevented. Also, the bottom side 52 of the external contour shape is appropriately inclined. This decreases engagement pressure and improves mountability on a rim.

In the structure described above, when the internal angle θ1 is an obtuse angle, in order to appropriately fold back the carcass layer 4 around the bead core 5, there is a need to dispose a bead filler on the outer side of the bead core 5 in the tire radial direction. This makes effectively reducing tire weight difficult. When the angle θ2 of the bottom side 52 is less than 2°, the engagement pressure cannot be sufficiently reduced. When the angle θ2 of the bottom side 52 is greater than 9°, rim disengagement resistance cannot be improved.

As illustrated in FIG. 3, a maximum width W0 of the bead core 5, a width W1 of the innermost layer in the tire radial direction, and a width W2 of the outermost layer in the tire radial direction, preferably satisfy the relationships W1>W2 and W2≤0.5×W0. Also, the layer with the maximum width W0 of the layers of the bead core 5 is preferably disposed toward the inside in the tire radial direction of the center position of the bead core 5 in the tire radial direction. As illustrated in the drawings, note that the widths W0 to W2 are the lengths in the tire lateral direction between outer ends in the tire lateral direction of the circumferential portions on both sides in the tire lateral direction of each layer. In a configuration in which the widths W0, W1, and W2 do not satisfy the relationships described above, the shape of the bead core 5 is not suitable and the shape of the bead portion 3 cannot be stabilized. In particular, when the configuration has the relationships W1≤W2 and W2>0.5×W0, the width of the upper end of the bead core 5 is large. Thus, the rigidity of the region where the rim flange abuts the tire increases and suppressing rim disengagement caused by the rotational force about the point as a fulcrum where the rim flange abuts the tire is difficult, resulting in rim disengagement resistance decreasing.

The specific shape of the bead core 5 is not particularly limited and is only required to have the relationships described above. For example, the shapes illustrated in FIGS. 4A to 4C may be employed. The examples of FIGS. 4A to 4C all satisfy the relationships described above and correspond to the "radially outward wedge shape" of the present technology. Specifically, FIG. 4A illustrates a 5+4+3+2+1 packed structure, FIG. 4B illustrates a 4+4+3+2+1 packed structure, and FIG. 4C illustrates a 4+4+3+2+1 structure in which the innermost layer in the tire radial direction and the layer adjacent thereto located toward the inside in the tire radial direction are stacked in alignment rather than being packed (stacked in a manner that adjacent circumferential portions in the tire radial direction are layered on one another perpendicular to the tire lateral direction).

Of the various shapes that the bead core 5 can have, an internal angle θ3 of the corner portion located at either end of the bottom side 52 of the external contour shape is preferably 90° or greater and more preferably from 100° to 150°. That is, in the examples of FIGS. 4A to 4C, the structures of FIGS. 4B and 4C are preferable. Setting the internal angle θ3 in this manner has the advantage in that the arrangement of the bead wire 5A can be prevented from being disrupted in vulcanization and the shape of the bead core 5 after vulcanization is improved. This allows the tire weight to be reduced and good rigidity to be ensured. When the internal angle θ3 is less than 90°, the number of times the bead wire 5A is wound cannot be sufficiently reduced and the reducing effect of tire weight is decreased. Also, when the internal angle θ3 is less than 90°, the bead wire 5A located on either end of the bottom side 52 of the external contour shape is subjected to the effects of rubber flow during vulcanization to a greater extent and the good shape of the bead core 5 after vulcanization is difficult to maintain.

Figure 4A:
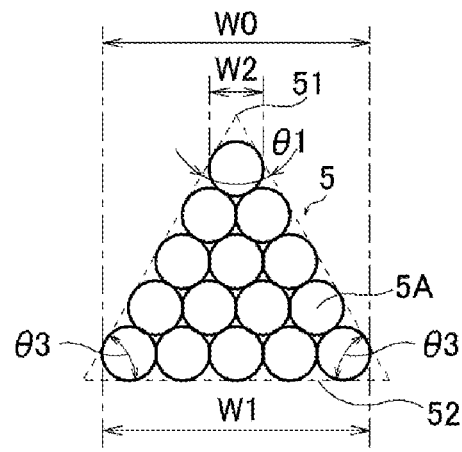
FIGS. 4A to 4C are schematic views illustrating the bead core according to another embodiment of the present technology.
Figure 4B:
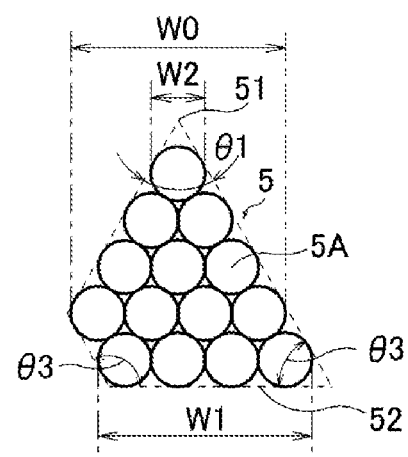
Figure 4C:
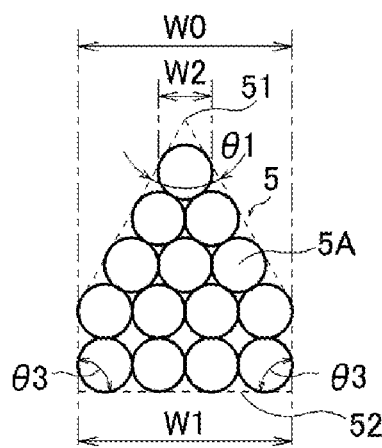

In the structures illustrated in FIGS. 4A to 4C, at least one portion is packed together in layers. Compared to a structure in which the bead wires are all stacked in alignment, this allows the bead wire 5A to be fit close together and the space filling ratio of the bead wire 5A to higher. As a result, the good rigidity and pressure resistance performance of the bead portion 3 can be ensured, running performance can be maintained, and tire weight can be reduced, these performances being obtained in a well-balanced manner. Focusing on the space filling ratio of the bead wire 5A, preferably all of the bead wire 5A is packed together in layers, as illustrated in FIGS. 4A and 4B.

Also, focusing on the shape of the bead core 5, to increase the stability of the overall shape of the bead core 5, the overall shape of the bead core 5 is preferably axisymmetric with respect to the center of the bead core 5 in the tire lateral direction. From this perspective, shapes such as those illustrated in FIGS. 4A and 4C are preferable.

The shapes of the bead core 5 can be selected as appropriate depending on the important characteristics, the overall structure of the pneumatic tire and the like on the basis taking into account the various perspectives described above.

The structure of the bead wire 5A itself is not particularly limited, but taking into account improving tire weight reduction and rim disengagement resistance in a compatible manner, the average diameter is preferably from 0.8 mm to 1.8 mm, more preferably from 1.0 mm to 1.6 mm, and even more preferably from 1.1 mm to 1.5 mm. Also, the total cross-sectional area of the bead wire 5A (the sum of the cross-sectional areas of the circumferential portions of the bead wires 5A included in a meridian cross-section of the bead core 5) is preferably from 10 mm$^2$ to 50 mm$^2$, more preferably from 15 mm$^2$ to 48 mm$^2$, and even more preferably from 20 mm$^2$ to 45 mm$^2$. When the average diameter of the bead wire 5A is less than 0.8 mm, the effect of improving the rim disengagement resistance is limited. When the average diameter of the bead wire 5A is greater than 1.8 mm, the effect of reducing tire weight is limited. When the total cross-sectional area of the bead wire 5A is less than 10 mm$^2$, the effect of improving the rim disengagement resistance is limited. When the total cross-sectional area of the bead wire 5A is greater than 50 mm$^2$, the effect of reducing tire weight is limited.

As described above, in the present technology, the closed region formed by the body portion 4A and the folded back portion 4B of the carcass layer 4 essentially only includes the bead core 5. A bead filler such as those used in known pneumatic tires or similar tire component (a member that increases rigidity from the bead portion 3 to the sidewall portion 2 disposed toward the outside of the bead core 5 in the tire radial direction and surrounded by the body portion 4A and the folded back portion 4B of the carcass layer 4) is not disposed. In other words, though insulation rubber covering the bead wire 5A or rubber filling the small gaps between the bead core 5 and the carcass layer 4 may be disposed, a bead filler with a large volume such as those in known pneumatic tires is not used. With this substantially bead filler-less structure, tire weight can be effectively reduced. Here, the ratio of a total area a of the rubber in the closed region to an area A of the closed region in a meridian cross-section (a/A×100%) is defined as the rubber occupation rate of the closed region. The rubber occupation rate is preferably from 0.1% to 15%. A rubber occupation rate of the closed region of greater than 15% is essentially the same as the known pneumatic tire including a bead filler and a further increase to the effect of reducing tire weight is difficult. Note that because rubber such as insulation rubber is always disposed covering the bead wire 5A due to the tire structure, a rubber occupation rate of the closed region of less than 0.1% is basically impossible.

Note that in a configuration such as that described above in which essentially only the bead core 5 is disposed in the closed region, depending on the tire size and desired performance, a filler layer (not illustrated) may be disposed toward the outside in the tire lateral direction of the carcass layer 4 (the body portion 4A and the folded back portion 4B) at the sidewall portion 2. This filler layer is different from a bead filler disposed between the body portion 4A and the folded back portion 4B of the carcass layer 4 in a known pneumatic tire, and works together with the side reinforcing layer 8 to ensure the rigidity of the sidewall portion 2. The filler layer is simply a member provided instead of a known bead filler layer, and a tire including a filler layer does not have more tire weight than a tire including a known bead filler layer. Note that to more effectively reduce tire weight, the filler layer structure and the like preferably have a certain relationship with the side reinforcing layer 8. For example, a relationship of a cross-sectional area S2 and a hardness H2 of the filler layer to a cross-sectional area S1 and hardness H1 of the side reinforcing layer 8 preferably satisfies $0.15 \leq (S2 \times H2)/(S1 \times H1) \leq 0.60$. In this way, the amount of filler layer used can be reduced to reduce the effect on tire weight and a reinforcing effect can be appropriately obtained from the filler layer.

As described above, in a pneumatic tire including the side reinforcing layer 8 with high rigidity in the region where the rim flange abuts the tire, in run-flat running condition, a force is generated that rotates the bead portion in the tire inner direction about a point as a fulcrum where the rim flange abuts the tire. This may cause rim disengagement. Thus, optimizing the structure in the region where the rim flange abuts the tire effectively increases rim disengagement resistance. Specifically, as illustrated in FIG. 2 in a meridian cross-section, a tire cross-sectional width T1 along an auxiliary line A1 and a tire cross-sectional width T2 along an auxiliary line A2 preferably satisfy the relationship $0.7 \leq T1/T2 \leq 1.5$ and more preferably satisfy the relationship $0.8 \leq T1/T2 \leq 1.0$, where the auxiliary line A1 is an auxiliary line running orthogonal to the carcass layer 4 that passes through an intersection point P1 of a straight line L1 extending parallel with the tire width direction separated from the bead toe 20 mm toward the outside in the tire radial direction and the contour line of the outer surface of the sidewall portion 2 and A2 is an auxiliary line that passes through the center of gravity of the bead core 5 and extends in the inclination direction of the bottom side 52 of the external contour shape. In this way, the rigidity of the region where the rim flange abuts the tire can be appropriately reduced and rim disengagement caused by the rotational force about the point as a fulcrum where the rim flange abuts the tire can be suppressed. This is advantageous in increasing rim disengagement resistance. When T1/T2 is greater than 1.5, the rigidity of the region where the rim flange abuts the tire is increased and the effect of suppressing rim disengagement caused by the rotational force about the point as a fulcrum where the rim flange abuts the tire cannot be sufficiently obtained. When T1/T2 is less than 0.7, sufficient run-flat durability is difficult to maintain.

As illustrated in FIG. 2, in the bead portion 3, the contour line of a bead base portion, defined as the portion between the bead toe and the bead heel, in a meridian cross-section preferably bends and has two different taper angles. The taper angles preferably satisfy the relationship $\theta 4 > \theta 5$, where $\theta 4$ is the taper angle on the bead toe side in the tire lateral direction and $\theta 5$ is the taper angle on the bead heel side in the tire lateral direction. The taper angle is not particularly limited, but $\theta 4$ may be from 15° to 25° and $\theta 5$ may be from 5° to 10°, for example. With such a structure, the bead base portion that abuts the rim is given a good shape. This is advantageous in that engagement pressure is reduced, improving mountability on a rim, and rim disengagement resistance is improved.

Figure 5:
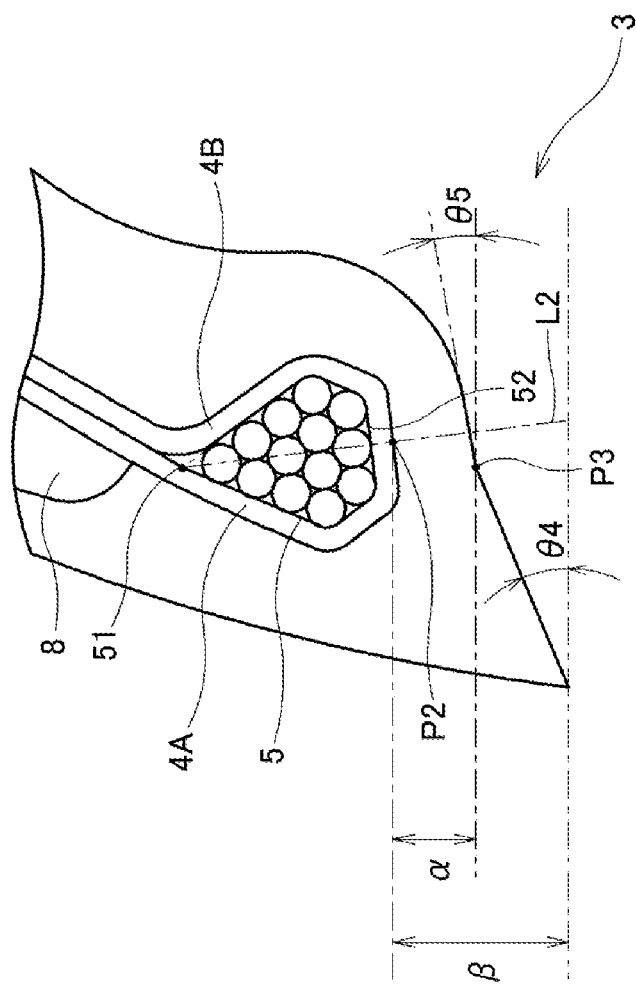
FIG. 5 is an enlarged explanatory diagram illustrating a region including the bead portion of FIG. 1.

As illustrated in FIG. 5, preferably the relationship $0.3 \leq \alpha/\beta \leq 0.8$ is satisfied and more preferably the relationship $0.45 \leq \alpha/\beta \leq 0.65$ is satisfied, where $\alpha$ is the length in the tire radial direction from an intersection point P2 of a perpendicular line L2 that extends to the bottom side 52 from the vertex 51 of the external contour shape and the outer surface of the carcass layer 4 located toward the inside of the bead core 5 in the tire radial direction to a bend point P3 of the contour line of the bead base portion and $\beta$ is the length in the tire radial direction from the intersection point P2 to the bead toe. In this way, the elements constituting the bead portion 3 are given a good positional relationship. This is advantageous in that engagement pressure is reduced, improving mountability on a rim, and rim disengagement resistance is improved. When $\alpha/\beta$ is less than 0.3, the rim fastening force increases, and when $\alpha/\beta$ is greater than 0.8, the engagement pressure increases.

Figure 6:
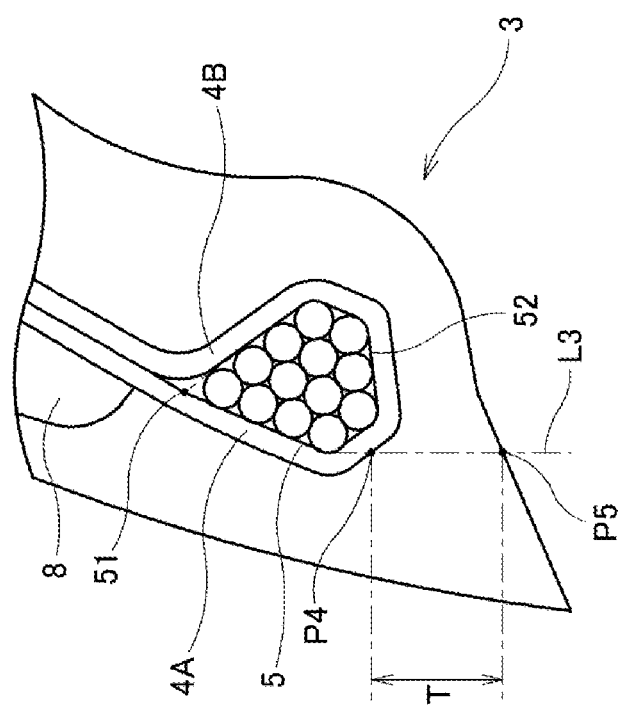
FIG. 6 is an enlarged explanatory diagram illustrating a region including the bead portion of FIG. 1.

Also, as illustrated in FIG. 6, a distance T between intersection points P4 and P5 is preferably from 3.1 mm to 4.0 mm, where, in a meridian cross-section, P4 is the intersection point of a straight line L3 extending in the tire radial direction contacting with the inner side in the tire axial direction of the circumferential portion of the plurality of circumferential portions of the bead wire 5A located innermost in the tire axial direction and the outer surface of the carcass layer 4 and P5 is the intersection point of the straight line L3 and the contour line of the bead base portion. In this way, the elements constituting the bead portion 3 are given a good positional relationship. This is advantageous in that engagement pressure is reduced, improving mountability on a rim, and rim disengagement resistance is improved. In particular, with the distance T being 3.1 mm or greater, when the bead portion 3 is fit on a rim within the tolerance range but away from the standard value, deviations away from an appropriate value of the fastening force of the rim can be suppressed. When the distance T is outside the range described above, the positional relationship of the elements constituting the bead portion 3 cannot be optimized and it becomes difficult to obtain a good balance between the effect of improving mountability on a rim by reduction of engagement pressure and the effect of improving rim disengagement resistance.

In the bead portion 3, a core lower material compression ratio Cm calculated by Formula 1 below using a thickness H of the core lower material measured along the perpendicular line L2 from the vertex 51 of the external contour shape to the bottom side 52 before mounting on a rim and a thickness H' of the core lower material measured along the perpendicular line L2 from the vertex of the external contour shape to the bottom side after mounting on a rim is preferably from 10% to 60%, more preferably from 15% to 50%, and even more preferably from 20% to 45%, where the core lower material is the rubber layer disposed further toward the inside in the tire radial direction than the portion of the carcass layer 4 contacting the bottom side 52 of the external contour shape of the bead core 5. Setting the core lower material compression ratio Cm within an appropriate range in this manner is advantageous in that engagement pressure is reduced, improving mountability on a rim, and rim disengagement resistance is improved. When the core lower material compression ratio Cm is less than 10%, the fastening force is insufficient. When the core lower material compression ratio Cm is greater than 60%, the engagement pressure is increased.

$$Cm=(H-H')/H\times 100 \quad (1)$$

The structure of each component described above can be appropriately combined and used. In any case, a pneumatic tire with a structure such as that described above has an enhanced bead portion 3 structure. Thus, tire durability can be maintained and tire weight reduced and engagement pressure and rim disengagement resistance can be enhanced.

EXAMPLE 27 types of pneumatic tires including Conventional Example 1, Comparative Examples 1 to 4, and Examples 1 to 22 having a tire size of 205/55R16 and the basic structure illustrated in FIG. 1 were manufactured. The pneumatic tires were set as indicated in Tables 1 to 3 for:

bead core structure, bead filler presence, internal angle $\theta 1$ formed by two sides sandwiching the vertex of the external contour shape of the bead core, angle $\theta 2$ formed by the bottom side of the external contour shape of the bead core and the tire lateral direction, core lower material compression ratio Cm, type of taper angle of the contour line of the bead base portion, ratio $\alpha/\beta$ of length $\alpha$ in the tire radial direction from an intersection point P2 of a perpendicular line that extends to the bottom side from the vertex of the external contour shape and the outer surface of the carcass layer located toward the inside of the bead core in the tire radial direction to a bend point of the contour line of the bead base portion and length $\beta$ in the tire radial direction from the intersection point P2 to the bead toe, internal angle $\theta 3$ of the corner portion located on either end of the bottom side of the external contour shape of the bead core, distance T between intersection point P1 of straight line L extending in the tire radial direction contacting with the inner side in the tire axial direction of the circumferential portion of the bead wire located innermost in the tire axial direction and the outer surface of the carcass layer and intersection point P2 of the straight line L and the contour line of the bead base portion, ratio T1/T2 between tire cross-sectional width T1 along the auxiliary line A1 orthogonal to the carcass layer and passing through an intersection point of a straight line extending parallel with the tire radial direction separated from the bead toe 20 mm toward the outside in the tire radial direction and the contour line of the outer surface of the sidewall portion and tire cross-sectional width T2 along the auxiliary line A2 passing through the center of gravity of the bead core and extending in the inclination direction of the bottom side of the external contour shape, and number of carcass layers.

The number in the row for "bead core structure" in Tables 1 to 3 indicate the corresponding figure number. Note that Conventional Example 1 is an example including a known and typical bead core. This bead core has the 5+5+5 stacked in alignment structure illustrated in FIG. 7A. The bead core of Comparative Example 1 has the 5+5+4+3+2+1 stacked in alignment structure illustrated in FIG. 7B. The bead core of Comparative Example 2 has the packed 8+7+6+4+2 structure illustrated in FIG. 7C. In the "$\theta 3$" row, the internal angles $\theta 3$ of the corner portions on both ends of the inner side in the tire radial direction of the external contour shape of the bead wire are listed.

Tire mass, engagement pressure, and rim disengagement resistance of the pneumatic tires are evaluated by the following evaluation method and the results are also shown in Tables 1 to 3.

Tire Mass

The mass of each of five test tires was measured and the average value was found. Evaluation results are expressed as index values with Conventional Example 1 being assigned the index value of 100. Smaller index values indicate smaller tire mass.

Engagement Pressure

The pressure (engagement pressure) when the bead portion of the test tire passes over the rim hump was measured, in inflating the tire to an air pressure of 230 kPa after mounting the test tire to rim with the rim size of 16×7.0 J. The engagement pressure was measured ten times for each tire and the average value was found. Evaluation results are expressed as index values, with the results of Conventional Example 1 being assigned as an index value of 100. Smaller index values indicate lower engagement pressure.

Rim Disengagement Resistance

Each test tire was mounted on a wheel with a rim size of 16×7.0 J and set to an air pressure of 0 kPa. The wheels were mounted on a test vehicle with an engine displacement of 2.0 L, and the test tires were run in for 5 km at a speed of 20 km/h as a preparation. Then a test in which the test vehicle enters a turning course with a radius of curvature of 25 m at a predetermined entering speed and stops at a position one third of the way around the turning course was performed two times in succession (J-turn test) and repeated. The J-turn test was repeated, increasing the entering speed by 2 km/h each time. The turning acceleration when the bead portion of the test tire disengages from the rim (hump of the rim) was measured and used in the evaluation of rim disengagement resistance. The measurement values of the turning acceleration are expressed as index values to obtain the evaluation results with Conventional Example 1 being assigned the index value of 100. Larger index values indicate superior rim disengagement resistance. Note that an index value of 96 or greater means that the rim disengagement resistance is equal to or better than conventional levels.

TABLE 1-1

Figure 7A:
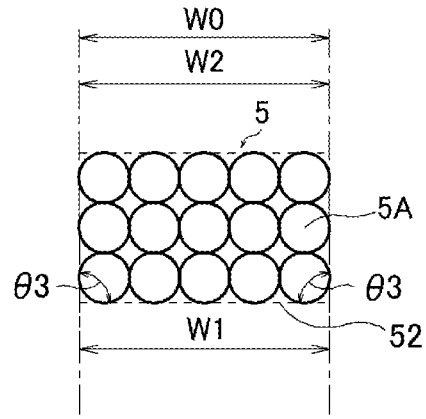
FIGS. 7A to 7C are explanatory diagrams schematically illustrating a bead structure of a Conventional Example and a Comparative Example.
Figure 7B:
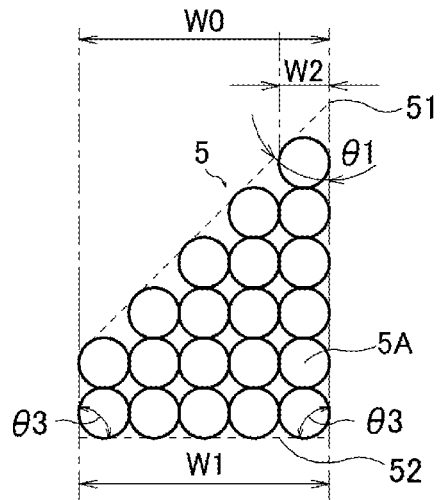
Figure 7C:
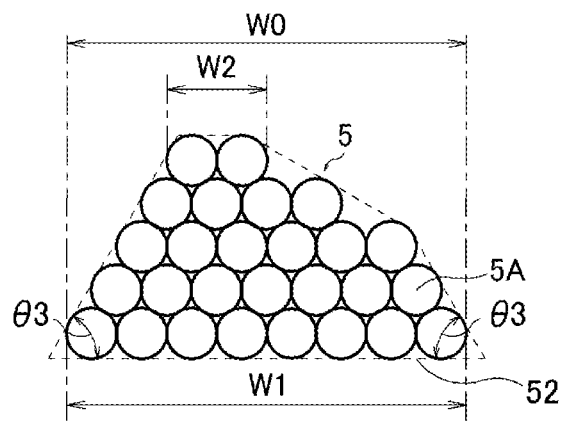

|  |  | Conventional Example 1 | Comparative Example 1 | Comparative Example 2 | Example 1 |
|---|---|---|---|---|---|
| Bead core structure |  | FIG. 7A | FIG. 7B | FIG. 7C | FIG. 4A |
| Bead filler |  | Yes | No | Yes | No |
| $\theta 1$ |  | — | 45 | — | Acute angle |
| $\theta 2$ | [°] | 0 | 0 | 0 | 7 |
| Cm | [%] | 8 |  |  | 30 |
| Type of taper angle |  | 1 | 1 | 1 | 1 |
| $\alpha/\beta$ |  | — | — | — | — |
| $\theta 3$ | [°] | 90 | 90 | 60 | 60 |
|  |  | 90 | 90 | 60 | 60 |
| T | [mm] | 3 | 3 | 3 | 3 |
| T1/T2 |  | 1.6 | 1.6 | 1.6 | 1.6 |

TABLE 1-1-continued

|  | Conventional Example 1 | Comparative Example 1 | Comparative Example 2 | Example 1 |
|---|---|---|---|---|
| Number of carcass layers | 2 | 2 | 2 | 2 |
| Tire mass Index value | 100 | 98 | 105 | 98 |
| Engagement pressure Index value | 100 | 100 | 104 | 95 |
| Rim disengagement resistance Index value | 100 | 101 | 104 | 100 |

TABLE 1-2

|  |  | Example 2 | Example 3 | Example 4 | Example 5 | Example 6 |
|---|---|---|---|---|---|---|
| Bead core structure |  | FIG. 4A | FIG. 4A | FIG. 2 | FIG. 2 | FIG. 2 |
| Bead filler |  | No | No | No | No | No |
| $\theta_1$ |  | Acute angle | Acute angle | Acute angle | Acute angle | Acute angle |
| $\theta_2$ | [°] | 7 | 7 | 7 | 7 | 7 |
| Cm | [%] | 30 | 30 | 30 | 30 | 30 |
| Type of taper angle |  | 2 | 2 | 2 | 2 | 2 |
| $\alpha/\beta$ |  | 0.2 | 0.5 | 0.5 | 0.5 | 0.5 |
| $\theta_3$ | [°] | 60 | 60 | 120 | 120 | 120 |
|  |  | 60 | 60 | 120 | 120 | 120 |
| T | [mm] | 3 | 3 | 3 | 3 | 3 |
| T1/T2 |  | 1.6 | 1.6 | 1.6 | 0.8 | 0.8 |
| Number of carcass layers |  | 2 | 2 | 2 | 2 | 1 |
| Tire mass Index value |  | 98 | 98 | 97 | 97 | 96 |
| Engagement pressure Index value |  | 97 | 95 | 94 | 94 | 94 |
| Rim disengagement resistance Index value |  | 100 | 100 | 100 | 102 | 102 |

TABLE 2-1

|  |  | Example 7 | Example 8 | Comparative Example 3 | Example 9 | Example 10 |
|---|---|---|---|---|---|---|
| Bead core structure |  | FIG. 4B | FIG. 4C | FIG. 2 | FIG. 2 | FIG. 2 |
| Bead filler |  | No | No | No | No | No |
| $\theta_1$ |  | Acute angle | Acute angle | Acute angle | Acute angle | Acute angle |
| $\theta_2$ | [°] | 7 | 7 | 1 | 2 | 9 |
| Cm | [%] | 30 | 30 | 30 | 30 | 30 |
| Type of taper angle |  | 2 | 2 | 2 | 2 | 2 |
| $\alpha/\beta$ |  | 0.5 | 0.5 | 0.5 | 0.5 | 0.5 |
| $\theta_3$ | [°] | 120 | 90 | 120 | 120 | 120 |
|  |  | 60 | 90 | 120 | 120 | 120 |
| T | [mm] | 3 | 3 | 3 | 3 | 3 |
| T1/T2 |  | 0.8 | 0.8 | 0.8 | 0.8 | 0.8 |
| Number of carcass layers |  | 1 | 1 | 1 | 1 | 1 |
| Tire mass Index value |  | 97 | 97 | 97 | 97 | 97 |
| Engagement pressure Index value |  | 94 | 93 | 99 | 98 | 90 |
| Rim disengagement resistance Index value |  | 100 | 100 | 99 | 98 | 97 |

TABLE 2-2

|  |  | Comparative Example 4 | Example 11 | Example 12 | Example 13 |
|---|---|---|---|---|---|
| Bead core structure |  | FIG. 2 | FIG. 2 | FIG. 2 | FIG. 2 |
| Bead filler |  | No | No | No | No |
| $\theta_1$ |  | Acute angle | Acute angle | Acute angle | Acute angle |
| $\theta_2$ | [°] | 10 | 7 | 7 | 7 |
| Cm | [%] | 30 | 8 | 10 | 60 |
| Type of taper angle |  | 2 | 2 | 2 | 2 |
| $\alpha/\beta$ |  | 0.5 | 0.5 | 0.5 | 0.5 |
| $\theta_3$ | [°] | 120 | 120 | 120 | 120 |
|  |  | 120 | 120 | 120 | 120 |
| T | [mm] | 3 | 3 | 3 | 3 |
| T1/T2 |  | 0.8 | 0.8 | 0.8 | 0.8 |
| Number of carcass layers |  | 1 | 1 | 1 | 1 |
| Tire mass Index value |  | 97 | 96 | 96 | 96 |
| Engagement pressure Index value |  | 89 | 93 | 94 | 99 |
| Rim disengagement resistance Index value |  | 96 | 100 | 100 | 100 |

TABLE 3-1

|  |  | Example 14 | Example 15 | Example 16 | Example 17 | Example 18 |
|---|---|---|---|---|---|---|
| Bead core structure |  | FIG. 2 | FIG. 2 | FIG. 2 | FIG. 2 | FIG. 2 |
| Bead filler |  | No | No | No | No | No |
| $\theta_1$ |  | Acute angle | Acute angle | Acute angle | Acute angle | Acute angle |
| $\theta_2$ | [°] | 7 | 7 | 7 | 7 | 7 |
| Cm | [%] | 30 | 30 | 30 | 30 | 30 |
| Type of taper angle |  | 2 | 2 | 2 | 2 | 2 |
| $\alpha/\beta$ |  | 0.3 | 0.8 | 0.5 | 0.5 | 0.5 |
| $\theta_3$ | [°] | 120 | 120 | 120 | 120 | 120 |
|  |  | 120 | 120 | 120 | 120 | 120 |
| T | [mm] | 3 | 3 | 3.1 | 3.5 | 4 |
| T1/T2 |  | 0.8 | 0.8 | 0.8 | 0.8 | 0.8 |
| Number of carcass layers |  | 1 | 1 | 1 | 1 | 1 |
| Tire mass Index value |  | 96 | 96 | 96 | 97 | 98 |
| Engagement pressure Index value |  | 94 | 96 | 96 | 97 | 98 |
| Rim disengagement resistance Index value |  | 100 | 101 | 101 | 99 | 98 |

TABLE 3-2

|  |  | Example 19 | Example 20 | Example 21 | Example 22 |
|---|---|---|---|---|---|
| Bead core structure |  | FIG. 2 | FIG. 2 | FIG. 2 | FIG. 2 |
| Bead filler |  | No | No | No | No |
| $\theta_1$ |  | Acute angle | Acute angle | Acute angle | Acute angle |
| $\theta_2$ | [°] | 7 | 7 | 7 | 7 |
| Cm | [%] | 30 | 30 | 30 | 30 |
| Type of taper angle |  | 2 | 2 | 2 | 2 |
| $\alpha/\beta$ |  | 0.5 | 0.5 | 0.5 | 0.5 |
| $\theta_3$ | [°] | 120 | 120 | 120 | 120 |
|  |  | 120 | 120 | 120 | 120 |
| T | [mm] | 3 | 3 | 3 | 3 |
| T1/T2 |  | 0.6 | 0.7 | 1 | 1.5 |

TABLE 3-2-continued

|  |  | Example 19 | Example 20 | Example 21 | Example 22 |
|---|---|---|---|---|---|
| Number of carcass layers |  | 1 | 1 | 1 | 1 |
| Tire mass | Index value | 96 | 96 | 96 | 96 |
| Engagement pressure | Index value | 96 | 96 | 96 | 96 |
| Rim disengagement resistance | Index value | 98 | 100 | 101 | 102 |

As can be seen from Tables 1 to 3, each of Examples 1 to 22 have reduced tire mass and enhanced engagement pressure and rim disengagement properties compared to Conventional Example 1, and provides these performances in a balanced and compatible manner. Comparative Example 1 has an unsuitable bead core shape, and thus cannot obtain an effect of reducing engagement pressure. Comparative Example 2 has an unsuitable bead core shape, and thus the tire mass is worse and engagement pressure is increased. In Comparative Example 3, θ2 is too small, and thus engagement pressure is not sufficiently reduced. In Comparative Example 4, θ2 is too large, and thus rim disengagement resistance is not improved.

The invention claimed is:

1. A pneumatic tire, comprising:
a tread portion with an annular shape that extends in a tire circumferential direction;
a pair of sidewall portions disposed on either side of the tread portion;
a pair of bead portions disposed toward the inside of the sidewall portions in a tire radial direction;
a bead core disposed in each one of the pair of bead portions;
a carcass layer mounted between the pair of bead portions; and
a side reinforcing layer having a crescent-shaped cross-section disposed toward the inside in a tire lateral direction of the carcass layer at each one of the pair of sidewall portions, wherein
the bead core comprises at least one bead wire wound in the tire circumferential direction,
in a meridian cross-section, a plurality of circumferential portions of the bead wire form at least one row in line in the tire lateral direction and a plurality of layers layered in the tire radial direction,
in a meridian cross-section, an external contour shape of the bead core is a polygon formed by common tangent lines of the circumferential portions of the bead wire, the external contour shape comprises a single vertex located toward the outside in the tire radial direction,
an internal angle formed by two sides sandwiching the vertex is an acute angle, the external contour shape comprises a bottom side located toward the inside in the tire radial direction extending at an incline with respect to the tire lateral direction, and the bottom side forms an angle with respect to the tire lateral direction from 2° to 9°;
the carcass layer comprises a body portion that extends from the tread portion, through a sidewall portion of the pair of sidewall portions, to a bead portion of the pair of bead portions, and a folded back portion that is bent and folded back along a circumference of the bead core in each one of the bead portions and is extending from a position of an outer end of the bead core in the tire radial direction toward one of the pair of sidewall portions in contact with the body portion;
a width W1 in the tire lateral direction of an innermost layer of the bead core in the tire radial direction and a maximum width W0 in the tire lateral direction of the bead core satisfy a relationship W1<W0; and
in a meridian cross-section, a tire cross-sectional width T1 along an auxiliary line A1 and a tire cross-sectional width T2 along an auxiliary line A2 satisfy a relationship 0.7≤T1/T2≤1.5,
where the auxiliary line A1 is an auxiliary line running orthogonal to the carcass layer that passes through an intersection point P1 of a straight line L1 extending parallel with a tire width direction separated from a bead toe 20 mm toward the outside in the tire radial direction and a contour line of an outer surface of the sidewall portion and A2 is an auxiliary line that passes through a center of gravity of the bead core and extends in an inclination direction of the bottom side of the external contour shape.

2. The pneumatic tire according to claim 1, wherein
portions located between a bead toe and a bead heel of the bead portions are defined as bead base portions, and
contour lines of the bead base portions in a meridian cross-section bend and have two different taper angles.

3. The pneumatic tire according to claim 2, wherein
a relationship 0.3≤α/β≤0.8 is satisfied,
where α is a length in the tire radial direction from an intersection point P2 of a perpendicular line L2 that extends to the bottom side from the vertex of the external contour shape and an outer surface of the carcass layer located toward the inside of the bead core in the tire radial direction to a bend point of contour lines of the bead base portions and β is a length in the tire radial direction from the intersection point P2 to the bead toe.

4. The pneumatic tire according to claim 1, wherein at least one internal angle of corner portions located on either end of the bottom side of the external contour shape is 90° or greater.

5. The pneumatic tire according to claim 1, wherein
a distance T between intersection points P4 and P5 is from 3.1 mm to 4.0 mm,
where, in a meridian cross-section, P4 is an intersection point of a straight line L3 extending in the tire radial direction contacting with an inner side in a tire axial direction of a circumferential portion of the plurality of circumferential portions of the bead wire located innermost in the tire axial direction and an outer surface of the carcass layer 4 and P5 is an intersection point of the straight line L3 and a contour line of a bead base portion.

6. The pneumatic tire according to claim 1, wherein the carcass layer comprises only one layer.

7. The pneumatic tire according to claim 1, wherein
a rubber layer located further toward the inside in the tire radial direction than a portion of the carcass layer contacting the bottom side of the external contour shape is defined as a core lower material, and
a core lower material compression ratio Cm calculated by Formula 1 below using a thickness H of the core lower material measured along a perpendicular line L2 from the vertex of the external contour shape to the bottom side before mounting on a rim and a thickness H' of the core lower material measured along the perpendicular line L2 after mounting on a rim is from 10% to 60%;

$$Cm=(H-H')/H\times 100 \tag{1}$$

8. The pneumatic tire according to claim 7, wherein
portions located between a bead toe and a bead heel of the bead portions are defined as bead base portions, and
contour lines of the bead base portions in a meridian cross-section bend and have two different taper angles.

9. The pneumatic tire according to claim 8, wherein
a relationship $0.3 \leq \alpha/\beta \leq 0.8$ is satisfied,
where $\alpha$ is a length in the tire radial direction from an intersection point P2 of a perpendicular line L2 that extends to the bottom side from the vertex of the external contour shape and an outer surface of the carcass layer located toward the inside of the bead core in the tire radial direction to a bend point of a contour lines of the bead base portions and $\beta$ is a length in the tire radial direction from the intersection point P2 to the bead toe.

10. The pneumatic tire according to claim 9, wherein at least one internal angle of corner portions located on either end of the bottom side of the external contour shape is 90° or greater.

11. The pneumatic tire according to claim 10, wherein
a distance T between intersection points P4 and P5 is from 3.1 mm to 4.0 mm,
where, in a meridian cross-section, P4 is an intersection point of a straight line L3 extending in the tire radial direction contacting with an inner side in a tire axial direction of a circumferential portion of the plurality of circumferential portions of the bead wire located innermost in the tire axial direction and an outer surface of the carcass layer 4 and P5 is an intersection point of the straight line L3 and a contour line of a bead base portion.

12. The pneumatic tire according to claim 11, wherein the carcass layer comprises only one layer.

* * * * *